United States Patent
Fujimori et al.

(10) Patent No.: US 6,777,528 B2
(45) Date of Patent: Aug. 17, 2004

(54) PROCESS FOR PRODUCING POLYCARBONATE RESIN

(75) Inventors: Takayasu Fujimori, Tsukuba (JP); Hiroaki Ohgi, Tsukuba (JP); Masamichi Mizukami, Tsukuba (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 195 days.

(21) Appl. No.: 10/092,592

(22) Filed: Mar. 8, 2002

(65) Prior Publication Data

US 2002/0132968 A1 Sep. 19, 2002

(30) Foreign Application Priority Data

Mar. 13, 2001 (JP) ........................................ 2001-069856

(51) Int. Cl.[7] .................... C08G 64/02; C08G 64/30
(52) U.S. Cl. ...................... 528/371; 528/200; 528/201; 528/370
(58) Field of Search ................. 528/200, 201, 528/370, 371

(56) References Cited

U.S. PATENT DOCUMENTS 5,322,919 A * 6/1994 Kurosawa

FOREIGN PATENT DOCUMENTS

| EP | 0 534 189 A1 | 3/1993 |
|---|---|---|
| EP | 1 065 231 A2 | 1/2001 |
| EP | 1 065 231 A3 | 10/2001 |
| JP | 5-1145 | 1/1993 |
| JP | 2000-302860 | 10/2000 |
| JP | 2001-11165 | 1/2001 |
| JP | 2001-11166 | 1/2001 |
| JP | 2001-11168 | 1/2001 |

OTHER PUBLICATIONS

XP–002200238, Abstract of JP 5–1145, Derwent Publications Ltd., AN 1993–049672.

* cited by examiner

Primary Examiner—David J. Buttner
(74) Attorney, Agent, or Firm—Sughrue Mion, PLLC

(57) ABSTRACT

A process for producing a polycarbonate resin which comprises performing melt polycondensation of pentacyclopentadecanedimethanol or pentacyclopentadecanedimethanol and diol with carbonic acid diester in the presence of a catalyst containing at least one compound selected from the group consisting of zinc compounds, tin compounds, lead compounds, zirconium compounds and hafnium compounds.

4 Claims, No Drawings

PROCESS FOR PRODUCING POLYCARBONATE RESIN

BACKGROUND OF THE INVENTION

1) Field of the Invention

The present invention relates to a process for producing a polycarbonate resin with both good transparency and good color which is not colored during its production.

2) Prior Art

A polycarbonate resin obtained by melt polycondensation of pentacyclopentadecanedimethanol represented by the general formula (1) and/or the general formula (2) with carbonic acid diester, as shown in Japanese Patent Kokai (Laid-open) No. 2000-302860, is excellent in transparency, heat resistance, impact resistance and possesses a low photoelastic constant and a good balance between refractive index and Abbe's number.

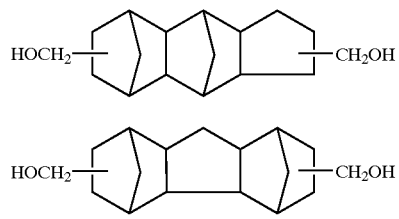

Thus, this polycarbonate resin is suitably applicable to plastic optical products such as optical disc substrates, various lenses, prisms, optical fibers and photoconductive boards.

However, when a catalyst such as basic compounds including alkaline metal compounds, alkaline earth metal compounds and nitrogen- or phosphorus-containing compounds described in Japanese Patent Kokai (Laid-open) No. 2000-302860 was used in the production, there caused problems that it was difficult to obtain a polycarbonate resin product with good color since the polycarbonate resin was readily colored during melt polycondensation.

A polycarbonate resin obtained by melt polycondensation of petacyclopentadecanedimethanol represented by the general formula (1) and/or the general formula (2) and alicyclic diol represented by the general foumula (4) with carbonic acid diester, as shown in Japanese Patent Kokai (Laid-open) No. 2001-11168, is excellent in transparency, heat resistance, flowability and possesses a low photoelastic constant and a good balance between refractive index and Abbe's number.

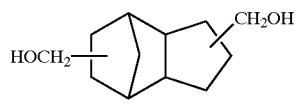

Thus, this polycarbonate resin is suitably applicable to plastic optical products such as optical disc substrates, various lenses, prisms, optical fibers and photoconductive boards.

However, when a catalyst such as basic compounds including alkaline metal compounds, alkaline earth metal compounds and nitrogen- or phosphorus-containing compounds described in Japanese Patent Kokai (Laid-open) No. 2001-11168 was used in the production, there caused problems that it was difficult to obtain a polycarbonate resin product with good color since the polycarbonate resin was readily colored during melt polycondensation.

A polycarbonate resin obtained by melt polycondensation of pentacyclopentadecanedimethanol represented by the general formula (1) and/or the general formula (2) and alicyclic diol represented by the general formula (5) with carbonic acid diester, as shown in Japanese Patent Kokai (Laid-open) No. 2001-11166, is excellent in transparency, heat resistance, flowability and possesses a low photoelastic constant and a good balance between refractive index and Abbe's number.

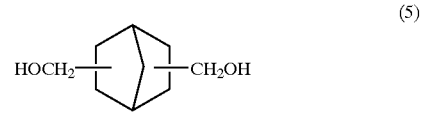

Thus, this polycarbonate resin is suitably applicable to plastic optical products such as optical disc substrates, various lenses, prisms, optical fibers and photoconductive boards.

However, when a catalyst such as basic compounds including alkaline metal compounds, alkaline earth metal compounds and nitrogen- or phosphorus-containing compounds described in Japanese Patent Kokai (Laid-open) No. 2001-11166 was used in the production, there caused problems that it was difficult to obtain a polycarbonate resin product with good color since the polycarbonate resin was readily colored during melt polycondensation.

A polycarbonate resin obtained by melt polycondensation of pentacyclopentadecanedimethanol represented by the general formula (1) and/or the general formula (2) and alicyclic diol represented by the general formula (6) with carbonic acid diester, as shown in Japanese Patent Kokai (Laid-open) No. 2001-11165, is excellent in transparency, heat resistance, flowability and possesses a low photoelastic constant and a good balance between refractive index and Abbe's number.

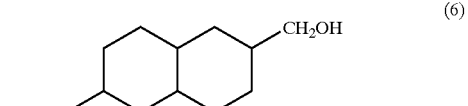

Thus, this polycarbonate resin is suitably applicable to plastic optical products such as optical disc substrates, various lenses, prisms, optical fibers and photoconductive boards.

However, when a catalyst such as basic compounds including alkaline metal compounds, alkaline earth metal compounds and nitrogen- or phosphorus-containing compounds described in Japanese Patent Kokai (Laid-open) No. 2001-11165 was used in the production, there caused problems that it was difficult to obtain a polycarbonate resin product with good color since the polycarbonate resin was readily colored during melt polycondensation.

A polycarbonate resin obtained by melt polycondensation of pentacyclopentadecanedimethanol represented by the general formula (1) and/or the general formula (2) and alicyclic diol represented by the general formula (7) with carbonic acid diester, as shown in Japanese Patent Kokai (Laid-open) No. 2001-11169, is excellent in transparency, heat resistance, flowability and possesses a low photoelastic constant and a good balance between refractive index and Abbe's number.

(7)

Thus, this polycarbonate resin is suitably applicable to plastic optical products such as optical disc substrates, various lenses, prisms, optical fibers and photoconductive boards.

However, when a catalyst such as basic compounds including alkaline metal compounds, alkaline earth metal compounds and nitrogen- or phosphorus-containing compounds described in Japanese Patent Kokai (Laid-open) No. 2001-11169 was used in the production, there causes problems that it was difficult to obtain a polycarbonate resin product with good color since the polycarbonate resin was readily colored during melt polycondensation.

SUMMARY OF THE INVENTION

An object of the present invention is to solve the above-mentioned prior art problems and to provide a process for producing a polycarboante resin with good transparency and good color which is not colored during its production.

As a result of extensive studies to solve the above-mentioned prior art problems, the inventors have found that the above-mentioned problems can be solved by a process for producing a polycarbonate resin which comprises performing melt polycondensation of pentacyclopentadecanedimethanol represented by the following general formula (1) and/or the following general formula (2) or pentacyclopentadecanedimethanol represented by the general formula (1) and/or the general formula (2) and diol represented by the following general formula (3) with carbonic acid diester in the presence of a catalyst containing at least one compound selected from the group consisting of zinc compounds, tin compounds, lead compounds, zirconium compounds and hafnium compounds;

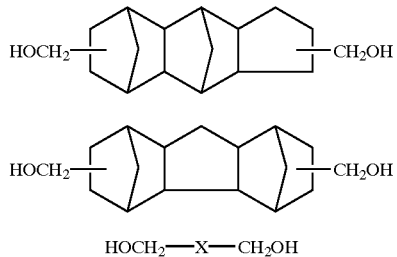

wherein X is an alkylene group having 3 to 14 carbon atoms or a cycloalkylene group having 4 to 14 carbon atoms, and have accomplished the present invention.

DETAILED DESCRIPTION OF THE INVENTION

The present invention will be described in more detail below.

Pentacyclopentadecanedimethanol represented by the general formula (1) and/or the general formula (2) is hereinafter abbreviated as "PCPDM".

Examples of diol represented by the general formula (3) include tricyclo(5.2.1.0$^{2,6}$) decanedimethanol, norbornane dimethanol, decaline-2,6-dimethanol, cyclohexane-1,4-dimethanol, 1,5-pentanediol, 1,6-hexanediol, 3-methyl-1,5-pentanediol, 1,7-heptanediol, 1,8-octanediol, 1,9-nonanediol, 1,10-decanediol, 1,11-undecanediol, 1,12-dodecanediol, 1,13-tridecanediol and 1,14-tetradecanediol.

The molar ratio (diol/PCPDM) of diol represented by the general formula (3) to PCPDM is preferably 0 to 2.3 from the aspect of heat resistance and more preferably 0 to 1. PCPDM, tricyclo(5.2.1.0$^{2,6}$) decanedimethanol, norbornane dimethanol, decaline-2,6-dimethanol and cyclohexane-1,4-dimethanol include all isomers thereof in the range of their structural formulas. Further, it is preferable that all the diols to be used have a high purity as much as possible.

As the catalyst to be used in the present invention, least one compound selected from the group consisting of zinc compounds, tin compounds, lead compounds, zirconium compounds and hafnium compounds is used. As the form of these compounds, oxide, halogenide, carboxylate, acetylacetonate, phenoxide, alkoxide and hydride, which are used alone or in the combination of plural compounds, are exemplified.

Preferable examples of the catalyst to be used in the present invention include at least one compound selected from the group consisting of the general formulas $ZnY_2$, $SnY_2$, $SnY_4$, $R_2SnO$, $R_2SnY_2$, $R_2Sn(OR')_2$, $PbY_2$, $PbY_4$, $ZrOY_2$, $ZrY_4$, $Zr(OR)_4$, $HfY_4$ and $Hf(OR)_4$ in which Y is a halogen atom, a carboxyl group having 1 to 18 carbon atoms, an acetylacetonate group or a hydrogen atom and R and R' are, each independently, an alkyl group having 1 to 4 carbon atoms or an aryl group having 6 to 10 carbon atoms.

More preferable examples of the catalyst include zinc acetate, zinc benzoate, zinc acetylacetonate, stannous acetate, stannic choride, dibutyltin oxide, dibutyltin dilaurate, dibutyltin dimethoxide, lead(II) acetate, zirconium oxyacetate, zirconium acetylacetonate, zirconium chloride, zirconium phenoxide, zirconium butoxide and hafnium acetylacetonate.

The amount of the catalyst is preferably $10^{-9}$ to $10^{-3}$ mol and more preferably $10^{-8}$ to $10^{-5}$ mol to sum total 1 mole of pentacyclopentadecanedimethanol represented by the general formula (1) and/or the general formula (2) and diol represented by the general formula (3).

Examples of carbonic acid diester to be used in the present invention include diphenyl carbonate, ditolyl carbonate, ethylphenyl carbonate, dinaphthyl carbonate, dimethyl carbonate, diethyl carbonate, dipropyl carbonate, dibutyl carbonate and dicyclohexyl carbonate, among which diphenyl carbonate is preferable.

The amount of carbonic acid ester is preferably 0.97 to 1.10 mol and more preferably 0.99 to 1.04 mol to sum total 1 mole of pentacyclopentadecanedimethanol represented by the general formula (1) and/or the general formula (2) and diol represented by the general formula (3).

The melt polycondensation in the present invention can be performed by known processes. That is, pentacyclopentadecanedimethanol represented by the general formula (1) and/or the general formula (2), or pentacyclopentadecane dimethanol represented by the general formula (1) and/or the general formula (2) and diol represented by the general formula (3), carbonic acid diester and the catalyst are mixed with stirring and then melt polycondensation is performed while removing by-products under atmospheric pressure or a reduced pressure with heating. The reaction is usually performed in multi stage step of two stages or above.

In detail, the first stage reaction is performed at 120 to 260° C. and preferably at 180 to 240° C. for 0.1 to 5 hours and preferably for 0.3 to 3 hours. Then, the reaction temperature is raised while increasing a reduced pressure of the reaction system to perform the reaction of diol with carbonic acid diester. Finally, melt polycondensation is performed under a reduced pressure of 1 mmHg or below at a temperature of 200 to 300° C. It is preferable that total reaction time is 2 to 9 hours. Such reaction may performed continuously or batch wise.

PREFERRED EMBODIMENT OF THE INVENTION

The present invention will be described in more detail below, referring to Examples, which are not intended to limit the scope of the present invention.

The properties of a resin were measured according to the following methods. [Weight average molecular weight based on polystyrene standard]

The measurement was made by GPC (gel permeation chromatography) using chloroform as a developing solvent. In more detail, a calibration curve of molecular weight-retention time was drawn up using polystyrene with known molecular weight by GPC and weight average molecular weight based on polystyrene standard was calculated based on the calibration curve.

Yellow Index (YI)

A pressed test piece of diameter 40 mm×thickness 3 mm was prepared and the measurement was made with a color-difference meter according to JIS K 7103 and JIS Z 8722.

EXAMPLE 1

52.5 g (0.2 mol) of PCPDM, 43.7 g (0.204 g) of diphenyl carbonate and $2.2\times10^{-4}$ g ($1.2\times10^{-6}$ mol) of zinc acetate were charged to a four neck flask of 300 ml equipped with a stirrer and a condenser and heated in a nitrogen atmosphere under 760 mmHg at 180° C. and stirred for 20 minutes.

Then, the degree of its interior reduced pressure was adjusted to 150 mmHg and simultaneously its interior temperature was elevated to 200° C. at the rate of 60° C./hr and maintained to the temperature for 20 minutes to perform melt polycondensation. Further, its temperature was elevated to 225° C. at the rate of 75° C./hr. After 20 minutes from the completion of temperature elevation, the pressure was reduced to 1 mmHg over one hour while maintaining 225° C. Then, its temperature was elevated to 235° C. at the rate of 60° C./hr and stirring was performed for 40 minutes under 1 mmHg at 235° C. After the completion of the reaction, nitrogen was injected into the reactor to return to atmospheric pressure and a polycarbonate resin thus produced was withdrawn.

The polycarbonate resin thus produced had Mw=64300 and YI=1.79.

EXAMPLE 2

The procedure was performed in the same manner as in Example 1 except that $3.0\times10^{-4}$ g ($1.2\times10^{-6}$ mol) of dibutyltin oxide was used without using zinc acetate.

The polycarbonate resin thus produced had Mw=52700 and YI=2.04.

EXAMPLE 3

The procedure was performed in the same manner as in Example 1 except that $2.8\times10^{-4}$ g ($1.2\times10^{-6}$ mol) of stannous acetate was used without using zinc acetate.

The polycarbonate resin thus produced had Mw=67600 and YI=2.33.

EXAMPLE 4

The procedure was performed in the same manner as in Example 1 except that $3.9\times10^{-4}$ g ($1.2\times10^{-6}$ mol) of lead (II) acetate was used without using zinc acetate and heat stirring was performed under 1 mmHg at 235° C. for 100 minutes.

The polycarbonate resin thus produced had Mw=54600 and YI=1.94.

EXAMPLE 5

The procedure was performed in the same manner as in Example 1 except that $5.9\times10^{-4}$ g ($1.2\times10^{-6}$ mol) of zirconium acetylacetonate was used without using zinc acetate.

The polycarbonate resin thus produced had Mw=59700 and YI=1.88.

EXAMPLE 6

The procedure was performed in the same manner as in Example 1 except that $6.9\times10^{-4}$ g ($1.2\times10^{-6}$ mol) of hafnium acetylacetonate was used without using zinc acetate and heat stirring was performed under 1 mmHg at 235° C. for 100 minutes.

The polycarbonate resin thus produced had Mw=55100 and YI=2.20.

EXAMPLE 7

The procedure was performed in the same manner as in Example 1 except that 26.2 g (0.1 mol) of PCPDM and 19.6 g (0.1 mol) of tricyclo($5.2.1.0^{2,6}$) decanedimethanol as diol were used.

The polycarbonate resin thus produced had Mw=61400 and YI=1.82.

EXAMPLE 8

The procedure was performed in the same manner as in Example 1 except that 26.2 g (0.1 mol) of PCPDM and 19.6 g (0.1 mol) of tricyclo($5.2.1.0^{2,6}$) decanedimethanol as diol were used and $3.0\times10^{-4}$ g ($1.2\times10^{-6}$ mol) of dibutyltin oxide was used without using zinc acetate.

The polycarbonate resin thus produced had Mw=53200 and YI=2.04.

EXAMPLE 9

The procedure was performed in the same manner as in Example 1 except that 26.2 g (0.1 mol) of PCPDM and 19.6 g (0.1 mol) of tricyclo($5.2.1.0^{2,6}$) decanedimethanol as diol were used and $2.8\times10^{-4}$ g ($1.2\times10^{-6}$ mol) of stannous acetate was used without using zinc acetate.

The polycarbonate resin thus produced had Mw=61000 and YI=2.25.

EXAMPLE 10

The procedure was performed in the same manner as in Example 1 except that 26.2 g (0.1 mol) of PCPDM and 19.6 g (0.1 mol) of tricyclo($5.2.1.0^{2,6}$) decanedimethanol as diol were used and $3.9\times10^{-4}$ g ($1.2\times10^{-6}$ mol) of lead(II) acetate was used without using zinc acetate and heat stirring was performed under 1 mmHg at 235° C. for 100 minutes.

The polycarbonate resin thus produced had Mw=52900 and YI=2.09.

EXAMPLE 11

The procedure was performed in the same manner as in Example 1 except that 26.2 g (0.1 mol) of PCPDM and 19.6 g (0.1 mol) of tricyclo(5.2.1.0$^{2,6}$) decanedimethanol as diol were used and 5.9×10$^{-4}$ g (1.2×10$^{-6}$ mol) of zirconium acetylacetonate was used without using zinc acetate.

The polycarbonate resin thus produced had Mw=61000 and YI=1.93.

EXAMPLE 12

The procedure was performed in the same manner as in Example 1 except that 26.2 g (0.1 mol) of PCPDM and 19.6 g (0.1 mol) of tricyclo(5.2.1.0$^{2,6}$) decanedimethanol as diol were used and 6.9×10$^{-4}$ g (1.2×10$^{-6}$ mol) of hafnium acetylacetonate was used without using zinc acetate and heat stirring was performed under 1 mmHg at 235° C. for 100 minutes.

The polycarbonate resin thus produced had Mw=55100 and YI=2.17.

EXAMPLE 13

The procedure was performed in the same manner as in Example 1 except that 26.2 g (0.1 mol) of PCPDM and 15.6 g (0.1 mol) of norbornane dimethanol as diol were used.

The polycarbonate resin thus produced had Mw=63300 and YI=1.89.

EXAMPLE 14

The procedure was performed in the same manner as in Example 1 except that 26.2 g (0.1 mol) of PCPDM and 15.6 g (0.1 mol) of norbornane dimethanol as diol were used and 3.0×10$^{-4}$ g (1.2×10$^{-6}$ mol) of dibutyltin oxide was used without using zinc acetate.

The polycarbonate resin thus produced had Mw=50200 and YI=1.97.

EXAMPLE 15

The procedure was performed in the same manner as in Example 1 except that 26.2 g (0.1 mol) of PCPDM and 19.8 g (0.1 mol) of decaline-2,6-dimethanol as diol were used and 3.0×10$^{-4}$ g (1.2×10$^{-6}$ mol) of dibutyltin oxide was used without using zinc acetate.

The polycarbonate resin thus produced had Mw=49300 and YI=2.10.

EXAMPLE 16

The procedure was performed in the same manner as in Example 1 except that 26.2 g (0.1 mol) of PCPDM and 19.8 g (0.1 mol) of decaline-2,6-dimethanol as diol were used and 2.8×10$^{-4}$ g (1.2×10$^{-6}$ mol) of stannous acetate was used without using zinc acetate.

The polycarbonate resin thus produced had Mw=62000 and YI=2.33.

EXAMPLE 17

The procedure was performed in the same manner as in Example 1 except that 26.2 g (0.1 mol) of PCPDM and 14.4 g (0.1 mol) of cyclohexane-1,4-dimethanol as diol were used.

The polycarbonate resin thus produced had Mw=65600 and YI=1.81.

EXAMPLE 18

The procedure was performed in the same manner as in Example 1 except that 26.2 g (0.1 mol) of PCPDM and 14.4 g (0.1 mol) of cyclohexane-1,4-dimethanol as diol were used and 5.9×10$^{-4}$ g (1.2×10$^{-6}$ mol) of zirconium acetylacetonate was used without using zinc acetate.

The polycarbonate resin thus produced had Mw=59800 and YI=1.88.

EXAMPLE 19

The procedure was performed in the same manner as in Example 1 except that 26.2 g (0.1 mol) of PCPDM and 14.4 g (0.1 mol) of cyclohexane-1,4-dimethanol as diol were used and 6.9×10$^{-4}$ g (1.2×10$^{-6}$ mol) of hafnium acetylacetonate was used without using zinc acetate and heat stirring was performed under 1 mmHg at 235° C. for 100 minutes.

The polycarbonate resin thus produced had Mw=56100 and YI=1.96.

EXAMPLE 20

The procedure was performed in the same manner as in Example 1 except that 44.6 g (0.17 mol) of PCPDM and 3.12 g (0.03 mol) of 1,5-pentanediol as diol were used.

The polycarbonate resin thus produced had Mw=63100 and YI=1.85.

EXAMPLE 21

The procedure was performed in the same manner as in Example 1 except that 47.2 g (0.18 mol) of PCPDM and 3.20 g (0.02 mol) of 1,9-nonanediol as diol were used and 5.9×10$^{-4}$ g (1.2×10$^{-6}$ mol) of zirconium acetylacetonate was used without using zinc acetate.

The polycarbonate resin thus produced had Mw=60000 and YI=1.82.

EXAMPLE 22

The procedure was performed in the same manner as in Example 1 except that 49.9 g (0.19 mol) of PCPDM and 2.30 g (0.01 mol) of 1,14-tetradecanediol as diol were used and 2.8×10$^{-4}$ g (1.2×10$^{-6}$ mol) of stannous acetate was used without using zinc acetate.

The polycarbonate resin thus produced had Mw=63300 and YI=1.94

Comparative Example 1

The procedure was performed in the same manner as in Example 1 except that 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=46200 and YI=3.60.

Comparative Example 2

The procedure was performed in the same manner as in Example 1 except that 1.9×10$^{-4}$ g (1.2×10$^{-6}$ mol) of calcium acetate was used without using zinc acetate and heat stirring was performed under 1 mmHg at 235° C. for 100 minutes.

The polycarbonate resin thus produced had Mw=46900 and YI=3.62.

Comparative Example 3

The procedure was performed in the same manner as in Example 1 except that 26.2 g (0.1 mol) of PCPDM and 19.6 g (0.1 mol) of tricyclo(5.2.1.0$^{2,6}$) dacanedimethanol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=45500 and YI=3.79.

Comparative Example 4

The procedure was performed in the same manner as in Example 1 except that 26.2 g (0.1 mol) of PCPDM and 19.6 g (0.1 mol) of tricyclo(5.2.1.0$^{2,6}$) dacanedimethanol as diol were used and 1.9×10$^{-4}$ g (1.2×10$^{-6}$ mol) of calcium acetate was used without using zinc acetate and heat stirring was performed under 1 mmHg at 235° C. for 100 minutes.

The polycarbonate resin thus produced had Mw=46400 and YI=3.66.

Comparative Example 5

The procedure was performed in the same manner as in Example 1 except that 26.2 g (0.1 mol) of PCPDM and 15.6 g (0.1 mol) of norbornane dimethanol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=44800 and YI=3.75.

Comparative Example 6

The procedure was performed in the same manner as in Example 1 except that 26.2 g (0.1 mol) of PCPDM and 19.8 g (0.1 mol) of decaline-2,6-dimethanol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=45000 and YI=3.99.

Comparative Example 7

The procedure was performed in the same manner as in Example 1 except that 26.2 g (0.1 mol) of PCPDM and 14.4 g (0.1 mol) of cyclohexane-1,4-dimethanol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=45800 and YI=3.69.

Comparative Example 8

The procedure was performed in the same manner as in Example 1 except that 44.6 g (0.17 mol) of PCPDM and 3.12 g (0.03 mol) of 1,5-pentanediol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=44900 and YI=3.78.

Comparative Example 9

The procedure was performed in the same manner as in Example 1 except that 47.2 g (0.18 mol) of PCPDM and 3.20 g (0.02 mol) of 1,9-nonanediol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=46500 and YI=3.64.

Comparative Example 10

The procedure was performed in the same manner as in Example 1 except that 49.9 g (0.19 mol) of PCPDM and 2.30 g (0.01 mol) of 1,14-tetradecanediol as diol were used and 1.0×10$^{-4}$ g (1.2×10$^{-6}$ mol) of sodium hydrogencarbonate was used without using zinc acetate and heat stirring was performed under 1 mmHg at 235° C. for 100 minutes.

The polycarbonate resin thus produced had Mw=47000 and YI=3.73.

According to the process for producing in the present invention, a polycarbonate resin with good color can be obtained maintaining sufficiently each property of transparency, heat resistance, impact strength, flowability and a balance between refractive index and Abbes' number. Therefore, the polycarbonate resin thus obtained is applicable to plastic optical products such as optical disc substrates, various lenses, prisms, optical fibers and photoconductive boards.

What is claimed is:

1. A process for producing a polycarbonate resin which comprises performing melt polycondensation of pentacyclopentadecanedimethanol represented by the following general formula (1) and/or the following general formula (2) or pentacyclopentadecanedimethanol represented by the general formula (1) and/or the general formula (2) and diol represented by the following general formula (3) with carbonic acid diester in the presence of a catalyst containing at least one compound selected from the group consisting of zinc compounds, tin compounds, lead compounds, zirconium compounds and hafnium compounds;

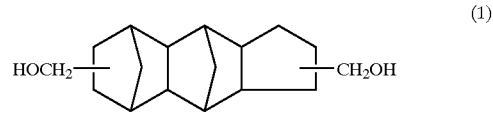

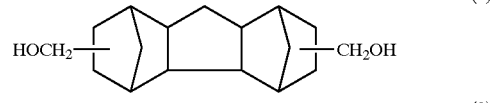

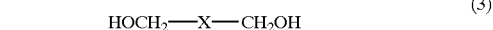

wherein X is an alkylene group having 3 to 14 carbon atoms or a cycloalkylene group having 4 to 14 carbon atoms.

2. The process according to claim 1, wherein said catalyst is at least one compound selected from the group consisting of the general formulas ZnY$_2$, SnY$_2$, SnY$_4$, R$_2$SnO, R$_2$SnY$_2$, R$_2$Sn(OR')$_2$, PbY$_2$, PbY$_4$, ZrOY$_2$, ZrY$_4$, Zr(OR)$_4$, HfY$_4$ and Hf(OR)$_4$ in which Y is a halogen atom, a carboxyl group having 1 to 18 carbon atoms, an acetylacetonate group or a hydrogen atom and R and R' are, each independently, an alkyl group having 1 to 4 carbon atoms or an aryl group having 6 to 10 carbon atoms.

3. The process according to claim 1, wherein said catalyst is at least one compound selected from the group consisting of zinc acetate, zinc benzoate, zinc acetylacetonate, tin acetate, tin chloride, dibutyltin oxide, dibutyltin laurate, lead acetate, zirconium oxyacetate, zirconium acetylacetonate, zirconium chloride, zirconium phenoxide, zirconium butoxide and hafnium acetylacetonate.

4. The process according to claim 1, wherein an amount of said catalyst is 10$^{-9}$ to 10$^{-3}$ mol to sum total 1 mol of pentacyclopentadecanedimethanol represented by the general foumula (1) and/or the general formula (2) and diol represented by the general formula (3).

* * * * *